(12) United States Patent
Buch et al.

(10) Patent No.: US 9,031,281 B2
(45) Date of Patent: May 12, 2015

(54) IDENTIFYING AN AREA OF INTEREST IN IMAGERY

(75) Inventors: Jeremy Thomas Buch, Louisville, CO (US); Charles Frankel, Denver, CO (US); Cody Keawe Yancey, Golden, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 13/530,366

(22) Filed: Jun. 22, 2012

(65) Prior Publication Data

US 2013/0343612 A1 Dec. 26, 2013

(51) Int. Cl.
G06K 9/00 (2006.01)
G06K 9/32 (2006.01)

(52) U.S. Cl.
CPC .......... G06K 9/00664 (2013.01); G06K 9/3233 (2013.01)

(58) Field of Classification Search
None
See application file for complete search history.

(56) References Cited

U.S. PATENT DOCUMENTS

| | | | |
|---|---|---|---|
| 6,252,608 B1 * | 6/2001 | Snyder et al. | 345/473 |
| 6,457,129 B2 | 9/2002 | O'Mahony | |
| 7,100,204 B1 | 8/2006 | Myllymaki | |
| 2002/0177449 A1 | 11/2002 | McDonnell et al. | |
| 2003/0053654 A1 | 3/2003 | Patterson | |
| 2008/0051989 A1 * | 2/2008 | Welsh | 701/208 |
| 2008/0219503 A1 * | 9/2008 | Di Venuto et al. | 382/103 |
| 2008/0301585 A1 | 12/2008 | Murray | |
| 2009/0210388 A1 * | 8/2009 | Elson et al. | 707/3 |
| 2009/0316955 A1 * | 12/2009 | Takeuchi | 382/103 |
| 2010/0020074 A1 * | 1/2010 | Taborowski et al. | 345/420 |
| 2010/0107126 A1 * | 4/2010 | Lin et al. | 715/838 |
| 2010/0165081 A1 * | 7/2010 | Jung et al. | 348/46 |
| 2010/0250109 A1 | 9/2010 | Johnston | |
| 2010/0250136 A1 | 9/2010 | Chen | |
| 2010/0295971 A1 | 11/2010 | Zhu | |
| 2011/0075882 A1 * | 3/2011 | Guo et al. | 382/100 |
| 2013/0266174 A1 * | 10/2013 | Bleiweiss et al. | 382/103 |

OTHER PUBLICATIONS

Lafarge et al ("Automatic building extraction from DEMs using an object approach and application to the 3D-city modeling", ISPRS Journal of Photogrammetry & Remote Sensing 63 (2008) 365-381).*

(Continued)

*Primary Examiner* — Shervin Nakhjavan
(74) *Attorney, Agent, or Firm* — Steven Spellman; Jim Ross; Micky Minhas

(57) ABSTRACT

Among other things, one or more techniques and/or systems are disclosed for identifying an area of interest comprising a desired object in imagery (e.g., so an image comprising the desired object may be altered in some manner). A determination can be made as to whether a capture event occurs within a proximity mask, where an object is not likely to be out of range if an image of the object is captured from within the proximity mask. For an image captured within the proximity mask, a determination can be made as to whether capture event imagery metadata for the image overlaps a footprint mask for the desired object. If so, the image may be regarded as comprising a discernible view of at least some of the desired object and is thus identified as an area of interest (e.g., that may be modified to accommodate privacy concerns, for example).

20 Claims, 10 Drawing Sheets

(56) References Cited

OTHER PUBLICATIONS

Knopp; et al., "Avoiding confusing features in place recognition"—Retrieved Date: Jan. 1, 2012, pp. 1-14, http://www.di.ens.fr/willow/pdfs/knopp10.pdf.

"GeocodeServiceClient.Geocode Method", Retrieved on Feb. 13, 2012, pp. 1-2, http://msdn.microsoft.com/en-us/library/cc966817.aspx.

* cited by examiner

IDENTIFYING AN AREA OF INTEREST IN IMAGERY

BACKGROUND

A variety of imagery of different locations around the world may be available for viewing online (e.g., on the Internet). For example, a user may enter an area or location of interest into a browser (e.g., address, city name, etc.) and resultantly be presented with one or more maps of the location. The user may, for example, be presented with one or more top views of the location (e.g., road view, bird's eye view, aerial view, etc.) and/or street views of the location, where the different views are based upon imagery of the location. For example, an aerial view may be based upon one or more satellite images of the location and/or a street view may be based upon one or more images acquired while driving down a street.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Some owners, proprietors, etc. of objects, such as buildings, properties, etc. may not wish for said objects to be available for viewing online, such as when comprised within imagery that may be displayed via an online mapping service (e.g., via an Internet browser). Some countries have "opt-out" provisions that allow individuals to indicate their desire for objects that they own, operate, etc. to not be displayed in online maps, for example. Typically, in order to identify and/or remove an image of a desired object (e.g., an opted-out object) from collected imagery, such as street-level imagery, satellite imagery, etc., respective frames (e.g., individual images) of imagery are manually searched and/or modified (e.g., redacting the opted-out object). It may be appreciated that if many individuals exercise "opt-out" and/or similar types of provisions, the manual identification and/or modification process can be very resource intensive.

Accordingly, among other things, one or more techniques and/or systems are disclosed for efficiently identifying an area of interest comprising at least some of a desired object, where a desired object generally corresponds to an object that is not to be distinguishable or is to be less distinguishable, discernible, etc. in imagery and/or one or more corresponding online maps derived therefrom (e.g., a desired object may correspond to an opted-out object). In order to accomplish the same, metadata associated with image capture events for imagery may be compared with information associated with a desired object to identify areas of interest in the imagery (e.g., an area in an image that likely comprises a view of an object that is otherwise not to be visible in an online map, for example). Further, the imagery may be modified, for example, to obscure, redact, etc. the desired object, based upon identified areas of interest.

In one embodiment of identifying an area of interest comprising a desired object in imagery, object mask data, comprising a footprint mask, can be received. The footprint mask can comprise a footprint area (e.g., a volume, area, etc.) of the desired object. A first area of interest can be identified in first capture event imagery by comparing footprint mask data with first capture event imagery metadata (e.g., to see if the desired object (or at least a portion thereof) is present in one or more images captured during the first capture event).

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1A:
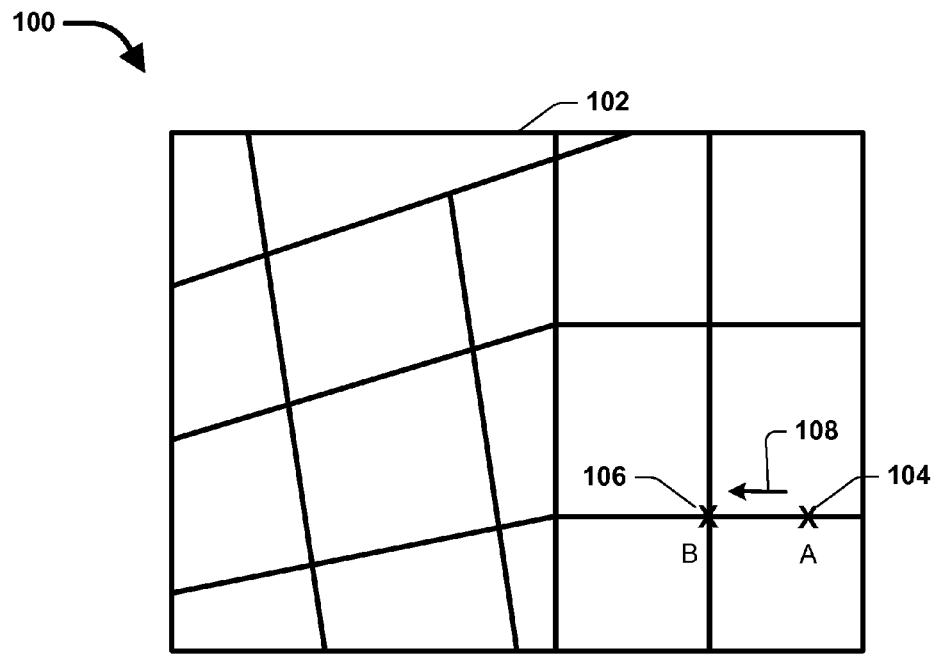
FIG. 1A illustrates an example of a map generally comprising a top view of an area.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1B:
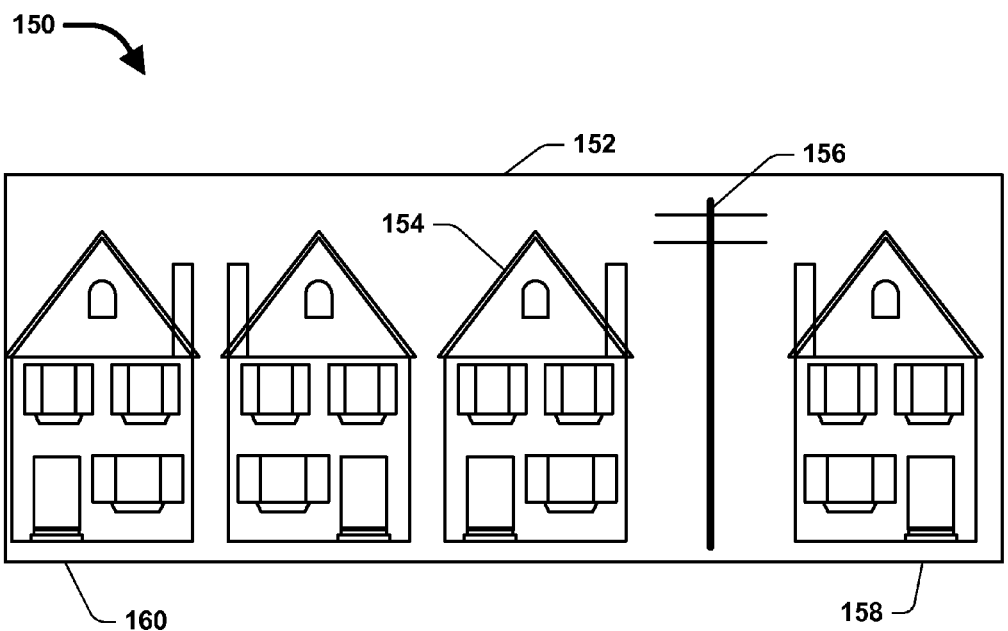
FIG. 1B illustrates an example of a map generally comprising a street view of an area.

FIG. 1A illustrates an example 100 of a map 102 generally comprising a top view of an area (e.g., aerial view, bird's eye view, road view, etc.) that may be provided by an online map service, for example. FIG. 1B illustrates an example 150 of a map 152 generally comprising a street view of an area that may be presented by an online map service, for example. It may be appreciated that map 152 may correspond to at least some of map 102. For example, a user may have entered location A 104 into an Internet browser and may have resultantly been presented with map 102 (e.g., at a particular level of zoom). The user may have also requested directions or a route from location A 104 to location B 106 and may been provided with the same as indicated by arrow 108 in FIG. 1A. The user may have then requested a street view of the route from A to B and thus may have been presented with map 152. That is, location A 104 may correspond to a first portion 158 of map 152 and location B 106 may correspond to a second portion 160 of the map 152 to illustrate a street view of the route from A to B, for example. The map 152 may thus comprise a view of one side of a street, between points A and B.

It may be appreciated that maps 102 and 152 are generated from imagery of the locations represented therein. For example, the street view in FIG. 1B may comprise a composition (e.g., in a planar panorama) of images collected along the street depicted in the example 150. The imagery lending to the example 150 shown in FIG. 1B comprises buildings 154, utilities 156, and/or other objects present at a time of image collection (e.g., one or more image capture events). It may be appreciated that it may be desirable to identify and/or obscure, redact, highlight, flag, etc. some objects in the map 152 to accommodate privacy concerns, for example. It may be appreciated that while imagery and/or the like may be described herein in the context of multiple images, the instant application including the scope of the appended claims is not to be so limited (e.g., to one or more capture event scenarios that may yield multiple images (e.g., that may be compiled into one or more cubes, bubbles, etc.)). That is, imagery may comprise merely a single image (e.g., that is examined to determine an area of interest and/or that may be modified in some manner for privacy concerns and/or other reasons). Imagery may thus comprise one image, one or more images, a composite, compilation, etc. of one or more images, etc.

Accordingly, one or more techniques and/or systems are provided herein, that efficiently identify areas of interest in collected imagery, for example, where an area of interest may comprise at least some of an object for which an "opt-out" (e.g., or "opt-in") request has been received, requesting that the object not be displayed (e.g., or that the object be highlighted, flagged, etc.) in imagery available online, such as in an online map, for example. As one example, when an area of interest is identified in the imagery, the object may be obscured from view (e.g., or tagged) in a resulting displayed image or online map generated therefrom. Further, merely those portions of captured imagery likely to comprise an "opted-out" object may be obscured, for example, thereby mitigating loss, removal, etc. of other objects in the imagery.

Figure 2:
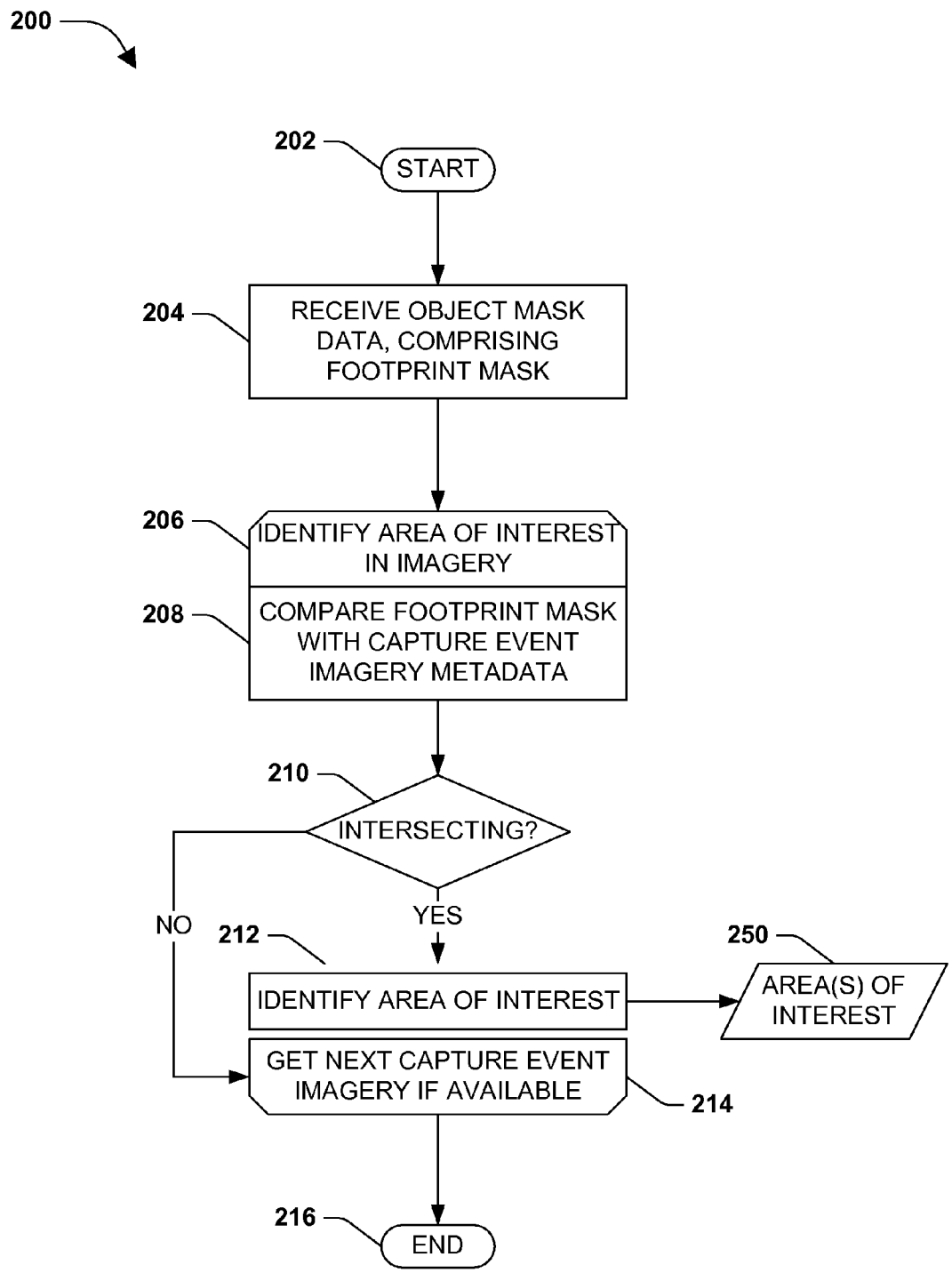
FIG. 2 is a flow diagram illustrating an example method for identifying an area of interest comprising a desired object in imagery.

FIG. 2 is a flow diagram illustrating an example method for identifying an area of interest comprising at least some of a desired object in imagery. The exemplary method 200 begins at 202. At 204, object mask data may be received, where the object mask data comprises a footprint mask (e.g., 604 in FIG. 6A) for a desired object (e.g., an opted-out object) where the footprint mask comprises a footprint area or two dimensional aspect of the desired object. It may be appreciated that while a footprint area may comprise an area covered by an outline of the desired object if viewed from above, a footprint area can also comprise an area covered by an outline of the desired object when viewed from any other line-of sight (e.g., from respective sides, from a downward angle, etc.). The footprint area may, for example, correspond to the (outline of a) foundation of a building. Further, in one embodiment, the footprint area may comprise a three dimensional aspect (e.g., a volume) comprising at least a volume that covers the desired object (e.g., a cube that encompasses the desired object). The footprint area may also comprise a temporal or four dimensional aspect, which may correspond to a change in the area, volume, etc. of the desired object which may be altered over time (e.g., due to construction, demolition, etc.). It may be appreciated that the footprint area may be slightly larger (or smaller) than the desired object to reduce the chance that some of the desired object will not be covered or will be missed by the footprint mask, for example.

At 206 in the exemplary method 200, an area of interest is identified in capture event imagery (e.g., one or more images about which information is known regarding the capture, acquisition, etc. of said images). As one example, an area of interest may be identified at 208 by comparing a footprint mask (e.g., and/or metadata associated therewith) for a desired object to first capture event imagery metadata to determine if there is any overlap (e.g., indicative of at least some of the desired object being present in at least one image captured during a first capture event). It may be appreciated that first, second, third, etc. are generally used herein as identifiers and are not necessarily intended to imply an ordering, sequence, temporal aspect, etc., as can generally be appreciated from the context within which first, second, third, etc. are used. For example, first capture event imagery metadata, first capture event, first capture event imagery, etc. are merely meant to distinguish the first capture event imagery metadata as being other than other capture event imagery metadata, to distinguish the first capture event as being other than one or more other capture events, and/or to distinguish the first capture event imagery as being other than some other capture event imagery, for example.

It may be appreciated that the first capture event imagery metadata may comprise, among other things, a location of the first capture event (e.g., geo-location, GPS data, address, elevation, etc. (e.g., associated with an image capture event device, such as a camera)), a time of the first capture event, a direction of view of the first capture event (e.g., a direction and/or angle of elevation of image capture event device (e.g., camera)), object distance from the first capture event (e.g., using RADAR, LIDAR, object triangulation, etc.), type of image capture event device, image capture event device specifications (e.g., resolution, focal length of lens, magnification, etc.), and/or other information related to the first capture event.

It may also be appreciated that the footprint mask can comprise metadata (e.g., footprint mask metadata) that may be compared with the first capture event imagery metadata to identify intersecting data (e.g., overlap indicating that at least some of the desired object is present in at least one image captured during the first capture event). As one example, the footprint area (e.g., comprising a volume covered by the mask) of the footprint mask may be associated with one or more locations (e.g., geo-locations, GPS data, a street (and/or other type of) address associated with a desired object, and/or elevations outlining the footprint mask), where the one or more locations may comprise metadata of the footprint mask. In this example, location metadata, direction of view metadata, etc. from the first capture event imagery may be compared with the location metadata for the footprint mask, to identify any intersection (e.g., overlap, match, etc.) of data.

Figure 3:
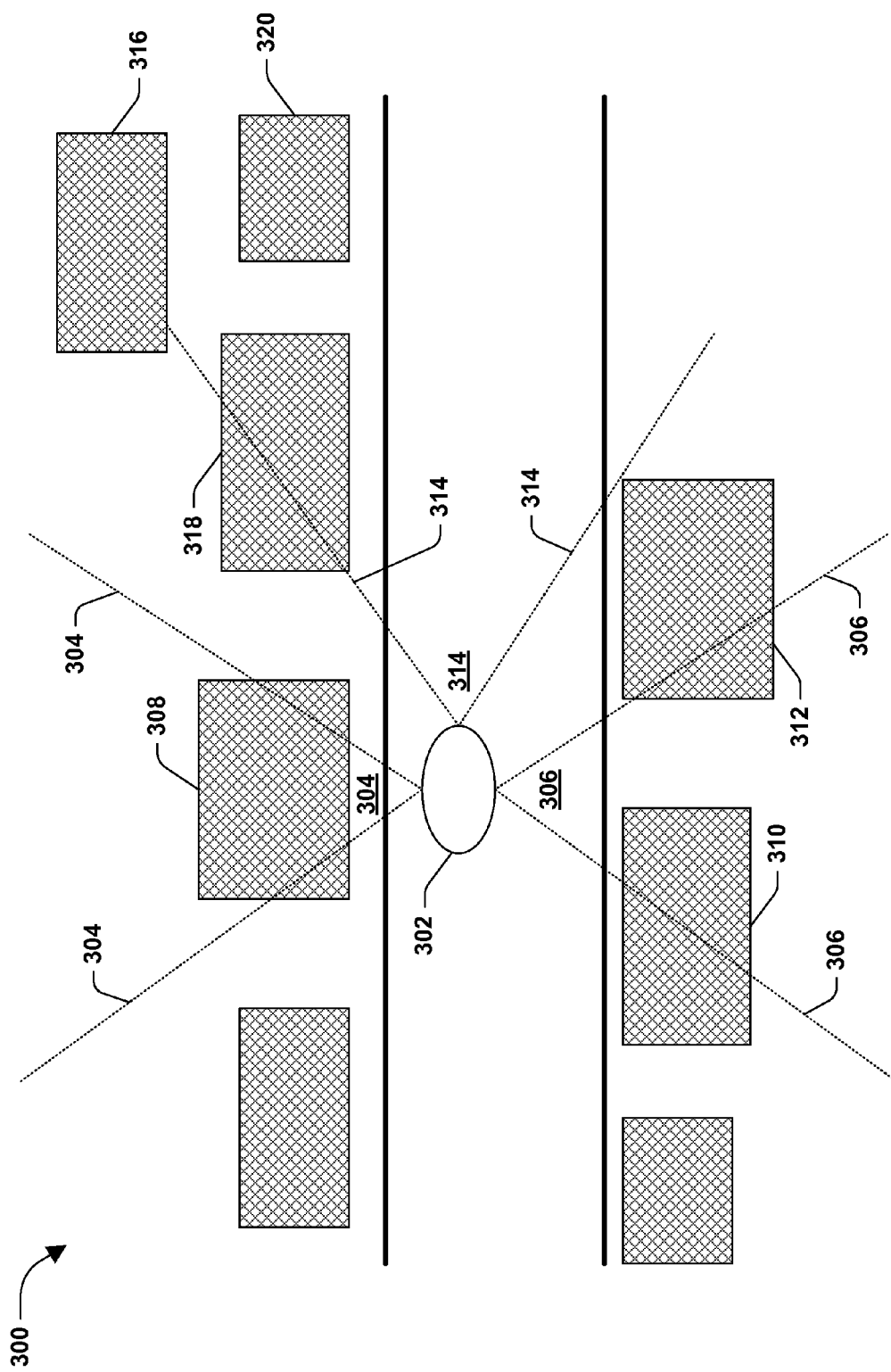
FIG. 3 illustrates an example or one or more image capture events.

Turning to FIG. 3, an example 300 of one or more image capture events is illustrated. An image capture event device 302, such as a vehicle or person carrying one or more image capture event devices (e.g., camera(s)) and/or metadata collection devices (e.g., GPS transceivers), may initiate a first image capture event to obtain first capture event imagery. As one example, the image capture event device 302 may travel down a street (e.g., corresponding to that illustrated in FIG. 1B) capturing imagery at desired intervals (e.g., in time and/or distance). In the example 300, the first image capture event has at least a first field of view 304 (e.g., acquiring one or more first images) and a second field of view 306 (e.g., acquiring one or more second images). Further, in this example, the first field of view 304 intersects with a first object 308, and the second field of view 306 intersects with a second object 310 and a third object 312. In this manner, at least some of the first object 308, the second object 310, and the third object 312 are comprised in the first capture event imagery.

It may be appreciated that first capture event imagery metadata may be associated with the first capture event and/or the first capture event imagery captured during the first capture event. By way of example, and not limitation, the first capture event imagery metadata may comprise metadata collected by the capture event device 302 and may comprise, among other things, a location of the capture event device 302 (e.g., from GPS, latitude, longitude, etc.) and/or field of view information (e.g., direction of image capture, area covered by the image, etc.) for the first field of view 304 and the second field of view 306. In this example, metadata (e.g., location information, such as from GPS, longitude, latitude, etc.) for a footprint mask comprising the first object 308 (e.g., desired object) may be compared with the collected first capture event imagery metadata to identify an area of interest (e.g., to determine if the first field of view 304 intersects the first object 308 such that at least some of the desired object is comprised within the first capture event imagery).

Returning to FIG. 2, at 210, if the first capture event imagery and/or first capture event imagery metadata associated therewith do not intersect with the footprint mask and/or footprint mask metadata associated therewith (e.g., comprising the desired object) (NO at 210), a next (e.g., second) set of capture event imagery and/or associated metadata may be selected for comparison, if available, at 214. As one example, in FIG. 3, the second field of view 306 may not intersect a footprint mask comprising the first object 308 (e.g., the desired object). Therefore, in this example, the first area of interest may not be identified in the first capture event imagery if the first capture event merely corresponds to the second field of view (e.g., which does not comprise the first object 308, which is the desired object in this example, but instead merely comprises the second object 310 and a third object 312).

Returning to FIG. 2, if the first capture event imagery and/or first capture event imagery metadata associated therewith do intersect with the footprint mask and/or footprint mask metadata associated therewith (YES at 210), an area of interest 250, such as a first area of interest for the first capture event, may be identified, at 212. As one example, the first capture event imagery metadata that is identified as intersecting the metadata for the footprint mask may be used to identify a portion of the imagery that comprises the footprint mask (e.g., comprising the desired object). For example, if merely a portion of the first capture event imagery (e.g., merely one image of multiple images, such as an image from the first field of view 304 but not an image from the second field of view 306 in FIG. 3) comprises the desired object, the portion comprising the desired object may be identified as the first area of interest 250. As another example, if any of the first capture event imagery metadata intersects the footprint mask, the first capture event imagery may comprise the first area of interest 250.

Having identified one or more areas of interest 250 (e.g., first, second, third, etc.), the exemplary method 200 ends at 216.

Figure 4:
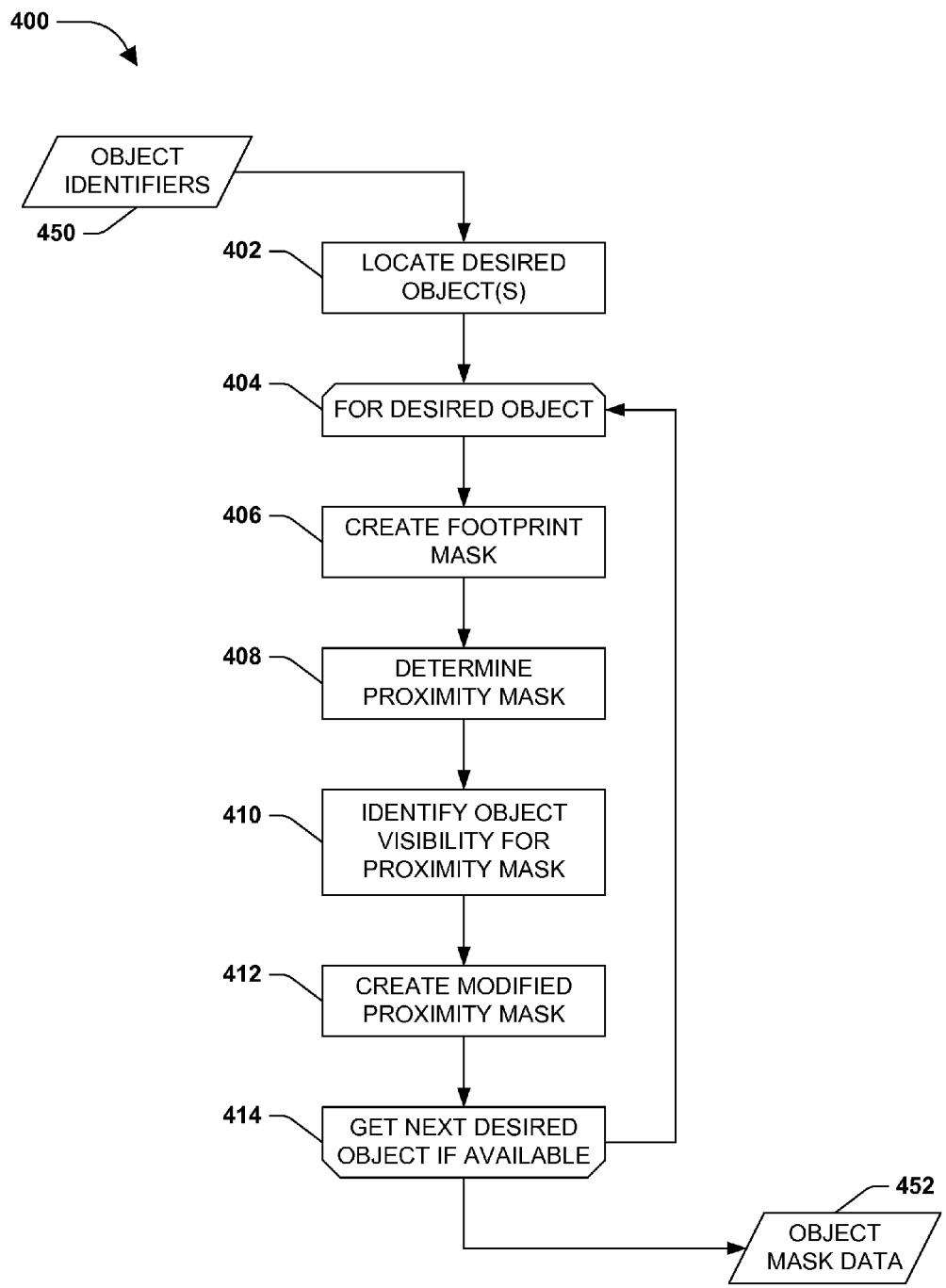
FIG. 4 is a flow diagram illustrating an example embodiment for creating footprint masks and/or proximity masks.

FIG. 4 is a flow diagram illustrating an example embodiment 400 for creating footprint masks and/or proximity masks. One or more object identifiers 450 may be provided and used to locate a desired object, at 402. As one example, a desired object can comprise a geo-located object (e.g., a non-transitory object at a known location), such as a building, monument, property parcel, etc. (e.g., or portion thereof), for which special attention may be desired in publically available imagery. For example, a property owner may not wish to have an image of his/her property (e.g., or portion thereof) available for public viewing online. As another example, the property owner may wish to have an image of his/her property (e.g., or portion thereof) highlighted in some way (e.g., tagged in an online map).

As an example, object identifiers 450, which may be used to locate the desired object, can comprise, among other things, an address (e.g., a street number, etc.), global positioning system coordinates (e.g., latitude and longitude, map grid coordinates), dimensions of the object (e.g., height, length, width), an elevation of the object, a description of the object (e.g., distinguishing features), and/or anything that may be used to identify the actual location of the object (e.g., on a map and/or in imagery). In one embodiment, locating the desired object may comprise applying the one or more object identifiers 450 to a mapping application, which may identify the desired object and/or location thereof on a map.

In one embodiment, the identified location may be verified, for example, by comparing the identified location with imagery comprising the object (e.g., an aerial view, street-level view, a bird's-eye view and/or other available imagery). In this embodiment, for example, the verification may result in an adjusted location for the desired object. Further, for example, the desired object may no longer be present at the location identified by the one or more object identifiers 450, which may be accounted for by the location verification (e.g., the object is removed or no longer indicated as being present at specified location).

At 404, for a desired object (e.g., a first desired object from a set of one or more desired objects for an area comprised by a mapping service location, such as a city, state, country, etc.), a footprint mask having a footprint area may be created, at 406. In one embodiment, the footprint mask comprises a footprint location of the desired object. In one example, the footprint area may have a two dimensional aspect, a three dimensional aspect and/or a four dimensional aspect. For example, the footprint area may comprise, be associated with, be defined by, etc. one or more locations (e.g., geo-location points) that outline at least the area and/or volume comprising the desired object. In one embodiment, the footprint area may be associated with a temporal aspect (e.g. fourth dimension), such as indicating an expected beginning time, period of time, and/or time limitation for the desired object to be located at the footprint location (e.g., or to comprise the dimensions of the footprint mask, if there is a change in size/shape).

In one embodiment, the footprint mask and/or the footprint area thereof can comprise a dimensional representation of at least the desired object. As one example, the footprint mask may cover the dimensions of the object (e.g., building) and may also be extended to cover a footprint area slightly larger than the object (e.g., to account for potential error in location and/or dimension determination). In one embodiment, the footprint mask can comprise a set of one or more geo-locations (e.g., coordinates and/or elevations) associated with a boundary of the dimensional representation. As one example, the set of one or more geo-locations may at least indicate an outline of the object, thereby covering respective sides, surfaces, etc. of the object in the footprint mask.

In one embodiment, the footprint mask may be created automatically/programmatically (e.g., utilizing an application on a computing device). As one example, the identified (e.g., and verified) location of the desired object may be combined with one or more of the object identifiers for the desired object to determine the footprint mask. In one embodiment, an initial footprint mask may be determined programmatically, and the initial footprint mask may subsequently be verified (e.g., manually) as part of a verification process, for example, which may result in the creation of a modified footprint mask that (more) effectively covers at least the desired object.

At 408 in the example embodiment 400, a proximity mask for the desired object may be obtained, determined, etc. In one embodiment, the proximity mask comprises a desired size or area around the desired object. As one example, the desired area around the desired object may comprise an area within which capture event imagery may comprise a distinguishable view of the desired object. That is, for example, if an image capture event occurred within the desired area, and the image capture event device was directed toward the desired object in a manner that may capture the desired object in the resulting imagery (e.g., within a field of view, such as 304 of FIG. 3), the resulting imagery may comprise a view of the desired object that is distinguishable (e.g., at a resolution that allows the desired object to be seen, be recognizable, etc.).

In one embodiment, identifying the proximity mask (e.g., size of desired area around the desired object) may be based on one or more desired object identifiers and/or capture event imagery metadata. As one example, capture event imagery metadata may comprise information about the image capture event device (e.g., camera), such as expected image resolution, focal length of lens, expected field of view, and/or other information that may affect a range of resolution of objects captured in resulting imagery.

As an example, an expected resolution of imagery resulting from an image capture event, combined with a size of the desired object, may be used to determine the desired area around the desired object. For example, an expected distance at which the desired object can no longer be resolved in the imagery (e.g., based on device resolution and size of the object) may be identified. In this example, an identified resolution distance may be used as a radius of the desired area around the desired object, thus effectively drawing a circular boundary around the desired object (e.g., with the desired object and/or footprint area at the center of the circle).

At 410 in the example embodiment 400, a visibility for a desired object can be identified for the proximity mask. As one example, object visibility may be indicative of whether at least a portion of the desired object is visible (e.g., distinguishable, resolvable, unobscured from view, etc.) in the imagery (e.g., street-side imagery, aerial imagery, etc. that is accessible online). For example, if a non-desired object (e.g., object that is not "opted-out" of the imagery) obscures the desired object (e.g., or portion thereof) from view in the imagery, then the object visibility from that vantage point may be negative (e.g., not visible). Alternatively, if at least a portion of the object is visible in the imagery, the object visibility from that vantage point may be positive (e.g., visible).

In one embodiment, for a proximity mask of a desired object, an object visibility determination may be made at respective vantage points in the imagery. As an illustrative example, in FIG. 3, the capture event device 302 may have captured a third image (e.g., during the first capture event) from a third field of view 314. In this example 300, the third field of view 314 intersects with or captures at least some of a fourth object 318 and a fifth object 320, which respectively obscure a view of a sixth object 316. In this example, if the sixth object 316 comprises the desired object, the object visibility from the vantage point corresponding to the third field of view 314 for the first capture event may be negative (e.g., not visible).

In one embodiment, object visibility may be determined using information (e.g., metadata) from the capture event for which object visibility is being determined, information for the desired object, data from other available imagery, and/or data gathered from a location of the vantage point for which object visibility is being determined. As one example, capture event imagery metadata may comprise object depth data, comprising a distance from the capture event (e.g., using RADAR, LIDAR, triangulation, etc.). In this example, object depth data combined with location information of the desired object may be used to determine if the desired object is visible from the vantage point of the image capture event. As another example, aerial imagery and/or data gathered from a location of the vantage point may be used to identify line of sight visibility for the desired object from one or more vantage points around the proximity mask.

Figure 6A:
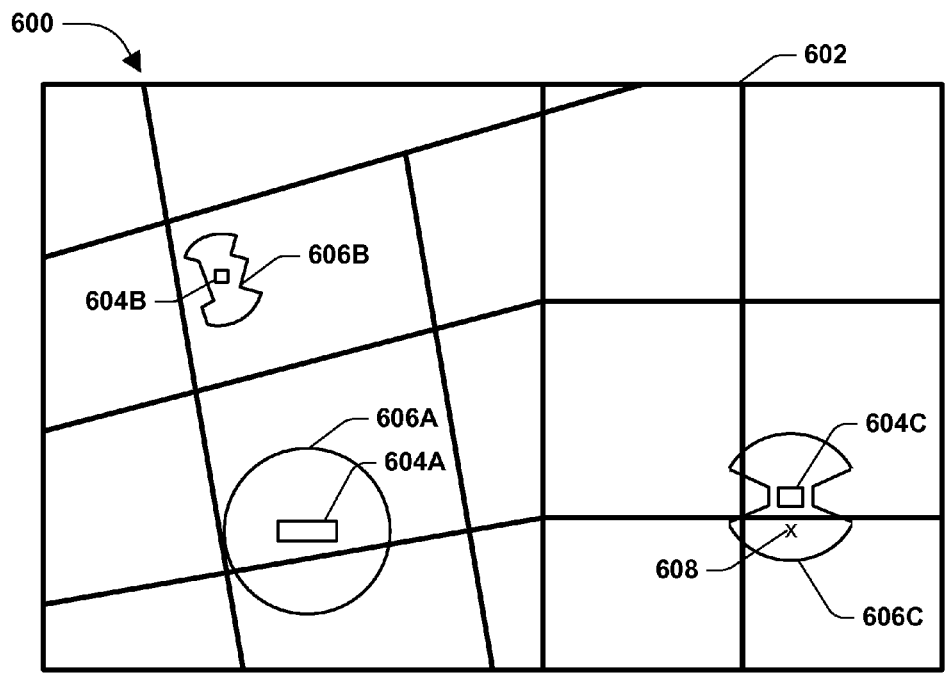
FIG. 6A illustrates an example of a map generally comprising a top view of an area.
Figure 6B:
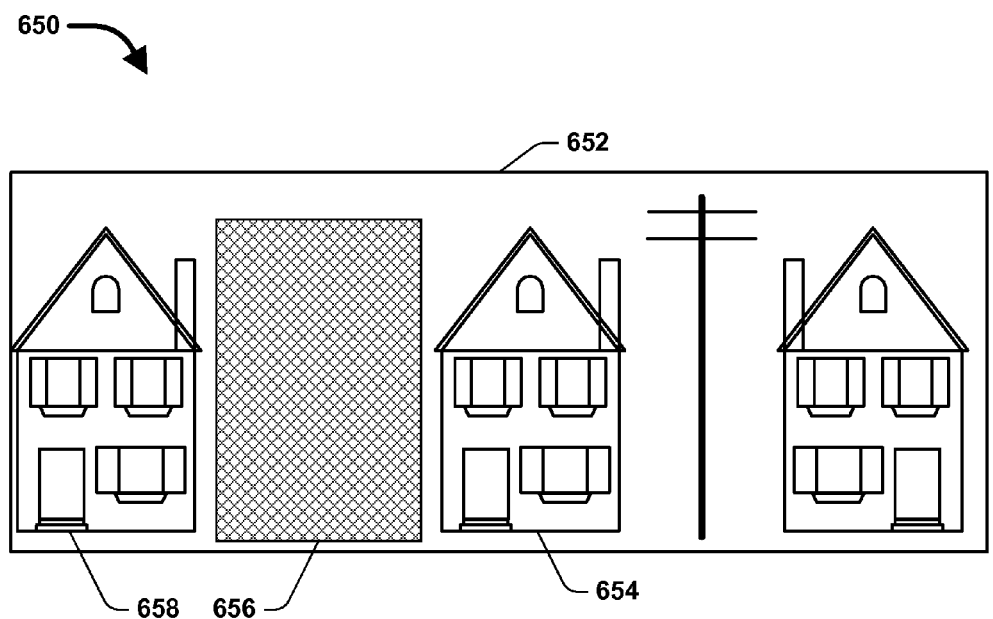
FIG. 6B illustrates an example of a map generally comprising a street view of an area.

Returning to FIG. 4, at 412, a modified proximity mask may be created for the desired object. As an illustrative example, FIGS. 6A and 6B illustrate example embodiments where one or more portions of one or more techniques described herein may be implemented. In the example 600, an example street map 602 comprises three proximity masks. A first proximity mask 606A comprises a circle around a first footprint mask 604A for a first desired object. A second proximity mask 606B around a second footprint mask 604B for a second desired object and a third proximity mask 606C around a third footprint mask 604C for a third desired object comprise somewhat irregular or non-circular shapes. As one example, the first proximity mask 606A merely comprises a boundary indicative of the proximity mask size (e.g., from 408 of FIG. 4). In this example, the boundary is not modified, as visibility may be positive for 360 degrees around the desired object (e.g., the desired object may be visible from respective vantage points of the proximity mask boundary).

As another example, the second proximity mask 606B and the third proximity mask 606C respectively comprise a modified proximity mask. In this example, the initial boundary (e.g., determined by the proximity mask size, as in 408 of FIG. 4) has been modified to account for visibility (or lack thereof) of a desired object from different vantage points. As one example, the third desired object (e.g., as designated by the third footprint mask 604C) may not be visible from a left side and right side of the desired object. For example, the third desired object may correspond to a third building 656 in the example embodiment 650 of FIG. 6B, where a first building 658 may obscure a view of the third building 656 from the left side, and a second building 654 may obscure a view of third building 656 from the right side (e.g., and thus imagery from the left side and/or the right side of the desired object would likely not need to be modified as the desired object is not likely visible in said imagery). Further, as an example, the second proximity mask 606B may indicate that one or more objects may obscure a view of the second desired object from at least some different vantage points of the second proximity mask (e.g., and thus imagery from such vantage points would likely not need to be modified).

It will be appreciated that, while the illustrated examples merely indicate a two dimensional (2D) representation of a proximity mask, the proximity mask is not limited to merely a 2D representation. As one example, as described above, imagery comprising a view of the desired object may comprise a side view (e.g., as in street-level imagery), a top view (e.g., as in satellite imagery), and/or an angled view from above (e.g., as in a bird's-eye view from aerial imagery). In one embodiment, the proximity mask (e.g., comprising an initial proximity mask and/or modified proximity mask) may comprise a three-dimensional (3D) boundary that surrounds the desired object on respective sides (e.g., like a bubble, cube or other 3D object). For example, in this embodiment, an initial proximity mask size can be determined (e.g., as in 408 of FIG. 4) from respective sides of the desired object, and the initial proximity mask may be modified (e.g., as in 410 and 412 of FIG. 4) based on the desired object visibility from respective vantage points of the 3D representation of the initial proximity mask.

Returning to FIG. 4, at 414, a next desired object (e.g., second desired object) may be processed, at 404, to determine a footprint mask and proximity mask (e.g., modified proximity mask) for the desired object. In one example, respective footprint masks and/or proximity masks may be determined for one or more desired objects resulting in object mask data 452 (e.g., where the one or more desired objects may be comprised within a designated area and/or within imagery of the designated area).

Figure 5:
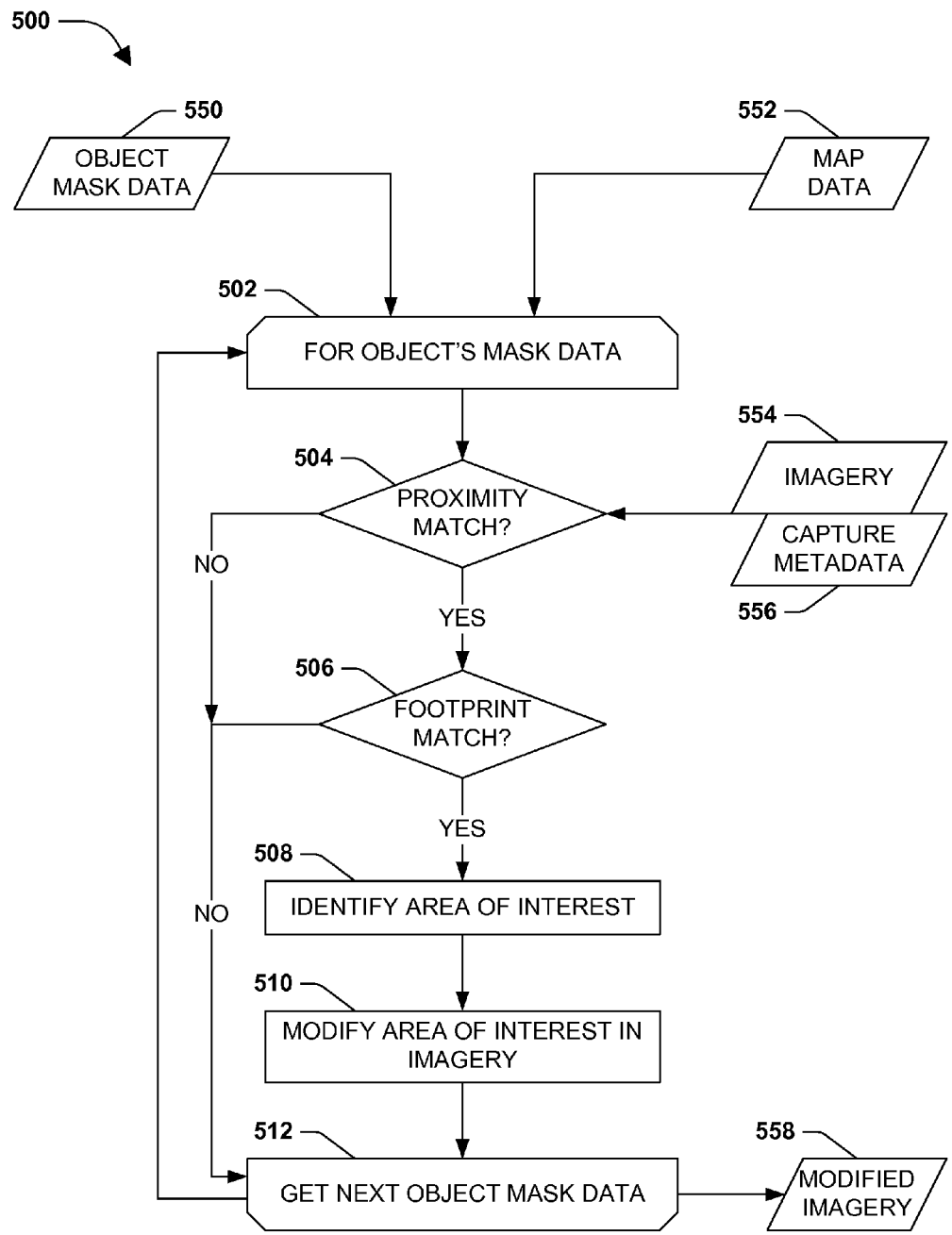
FIG. 5 is a flow diagram illustrating an example embodiment for identifying an area of interest comprising a desired object in imagery and/or for modifying an area of interest.

FIG. 5 is a flow diagram illustrating an example embodiment for identifying an area of interest comprising a desired object in imagery and/or for modifying an area of interest. At 502 in the example embodiment 500, object mask data 550 for a first desired object may be obtained to determine whether capture event imagery 554 associated with map data 552 (e.g., comprising a mapped area of interest) comprises an area of interest (e.g., at least one image wherein at least a portion of a first desired object is visible). At 504, capture event imagery metadata 556 for the capture event imagery 554 may be compared with a proximity mask for the first desired object. As one example, the proximity mask can comprise location data (e.g., coordinates) that identify a boundary of the proximity mask. In this example, capture event imagery metadata 556 for respective capture events of the capture event imagery 554 can be compared with the proximity mask location data to identify whether a capture event occurred within the proximity mask.

If the capture event imagery metadata 556 (e.g., capture location) does not match the proximity mask (e.g., fall within the (modified) proximity mask boundary) (NO at 504), a next (e.g., second) set of object mask data (e.g., for a second desired object) can be selected (e.g., if available), at 512, and processed beginning at 502. As one example, if no image capture events for the capture event imagery 554 occurred within the boundaries of the proximity mask for the first desired object, a distinguishable view of at least a portion of the desired object may not be available in the capture event imagery 554 (e.g., and thus no images may need to be modified to 'remove' a desired object).

If at least a portion of the capture event imagery metadata 556 does match the proximity mask (YES at 504) (e.g., indicating that an image of the first desired object was acquired from a location within the proximity mask), the capture event imagery metadata 556 can be compared with a footprint mask for the first desired object, at 506. As one example, if at least one image capture event location is identified within the boundaries of the proximity mask for the first desired object, metadata for the identified capture event can be compared with the footprint mask and/or metadata associate therewith to determine if at least a portion of the footprint mask intersects with a portion of the imagery from the identified capture event.

As an illustrative example, in FIG. 6A, an image capture event 608 is comprised within the third proximity mask 606C. In this example, as described above, metadata for the image capture event 608 (e.g., capture event imagery metadata) may comprise a location of the capture event (e.g., geo-location, GPS data, address, elevation, etc.), a direction of view of the capture event (e.g., a direction and/or angle of an image capture device), and/or other information related to the capture event. In one embodiment, the third footprint mask 604C (e.g., comprising a footprint area) and/or associated metadata may be associated with one or more locations (e.g., geo-locations, GPS data, and/or elevations outlining the third footprint mask 604C). As one example, location metadata and/or direction of view metadata from the image capture event 608 may be compared with location metadata for the third footprint mask 604C, to identify whether there is an intersection (e.g., match, overlap, etc.) of data.

Returning to FIG. 5, if the footprint mask for the first desired object does not match with the capture event imagery metadata 556 (NO at 506), a next (e.g., second) set of object mask data can be selected (e.g., if available), at 512, and processed beginning at 502. As one example, if at least one image of the first desired object was acquired from a location falling within the proximity mask (e.g., YES at 504), but none of the associated images that fall within the proximity mask comprise any (views) of the first desired object (e.g., NO at 506), a distinguishable view of at least a portion of the desired object may not be available in the capture event imagery 554 (e.g., and thus no images may need to be modified to 'remove' a desired object).

If at least a portion of the footprint mask and/or associated metadata for the first desired object do match, intersect, etc. with at least a portion of the capture event imagery metadata 556 (YES at 506), a first area of interest can be identified in the capture event imagery 554. In one embodiment, a location and a view direction of the capture event imagery can be identified using the metadata from identified image capture event. In this embodiment, a combination of the location and the view direction of the capture event imagery can be compared with a footprint mask area for the first desired object and/or a footprint mask location for the first desired object to identify the first area of interest. As one example, the portion of the capture event imagery that intersects with the footprint mask for the first desired object can comprise the first area of interest.

It may be appreciated that a capture event device (e.g., camera) may be configured to capture or generate imagery of an object at various locations relative to the object even though the device may remain at a fixed location relative to the object, or at least not be physically located at the various locations or origins from which associated imagery is deemed to have captured. For example, some image capture devices may be configured to have original effective pixels/unit area (e.g., square inch) at a given range instead of merely tied to an origin. In this manner, imagery generated from such an image capture device may not be associated with merely a single image acquisition/capture event location. Rather, imagery generated from such an image capture device may provide different views of the object as if acquired from different locations, for example. Where a range for such an image capture device is set to a maximum range, for example, a proximity map may be developed based upon effective pixel resolution, for example, where a pixel resolution may be a function of whether visibility of an object (e.g., desired object) is blocked, obscured, diminished, etc. in an image. Thus, given effective pixel resolutions at various views provided by an image capture device (e.g., located at fewer locations than correspond to the various views), a proximity map may be developed for a desired object where the shape of the proximity map may be a function of effective pixel resolution. For example, where effective pixel resolution indicates little to no visibility of an object from a particular perspective (e.g., as may be comprised within capture event imagery metadata), a shape, configuration, dimension, etc. of the proximity mask may be adjusted such that a view from this particular perspective is not comprised within the proximity map (e.g., because the desired object is not likely visible from this perspective and thus associated imagery from this perspective may not be of concern, need not be modified, etc.). In this manner, the footprint map can be a function of effective resolution, for example.

At 510 in the example embodiment 500, the first area of interest may be modified in the capture event imagery 554, resulting in modified imagery 558. In one embodiment, the modifying can comprise adjusting a visibility of the desired object in the capture event imagery such that the desired object is not distinguishable. As one example, the portion of imagery comprising the first area of interest may be "blurred" or changed such that previously distinguishing characteristics of the first desired object may no longer be distinguished in the imagery. As an illustrative example, in FIGS. 6A and 6B, the image capture event 608 may have captured imagery 652 comprising a desired object comprised in the third footprint mask 604C. In this example, an area of interest (e.g., portion of imagery comprising an "opted-out" building) has been modified such that the desired object is no longer visible in the imagery 652. It will be appreciated that an area of interest in other imagery (e.g., top-view and/or angled side-view), for example, may also be modified in a similar manner.

In one embodiment, modifying the area of interest may comprise applying a tag to the desired object, highlighting the desired object, and/or making the desired object standout from other portions of the imagery. As one example, a property owner (e.g., business owner) may wish to make their property stand-out from surrounding properties. In this example, an object tag may be applied that comprises information about the property (e.g., business name, hours of operation, etc.), and/or an image of the building may be adjusted to make it stand out from surrounding objects (e.g., removing surrounding objects that would otherwise obscure a view of the building, adjusting size, adjusting color, providing animation, etc.).

A system may be devised that can identify an area of interest in imagery, such as associated with a mapping service, for example, where an area of interest may be associated with an desired object. The desired object can comprise an object that an owner may not wish to be viewed in imagery available online, or may comprise an object that the owner wishes to highlight (e.g., tag). When an area of interest is identified in the imagery, the associated desired object may be modified (e.g., obscured or highlighted) in resulting displayed imagery.

Figure 7:
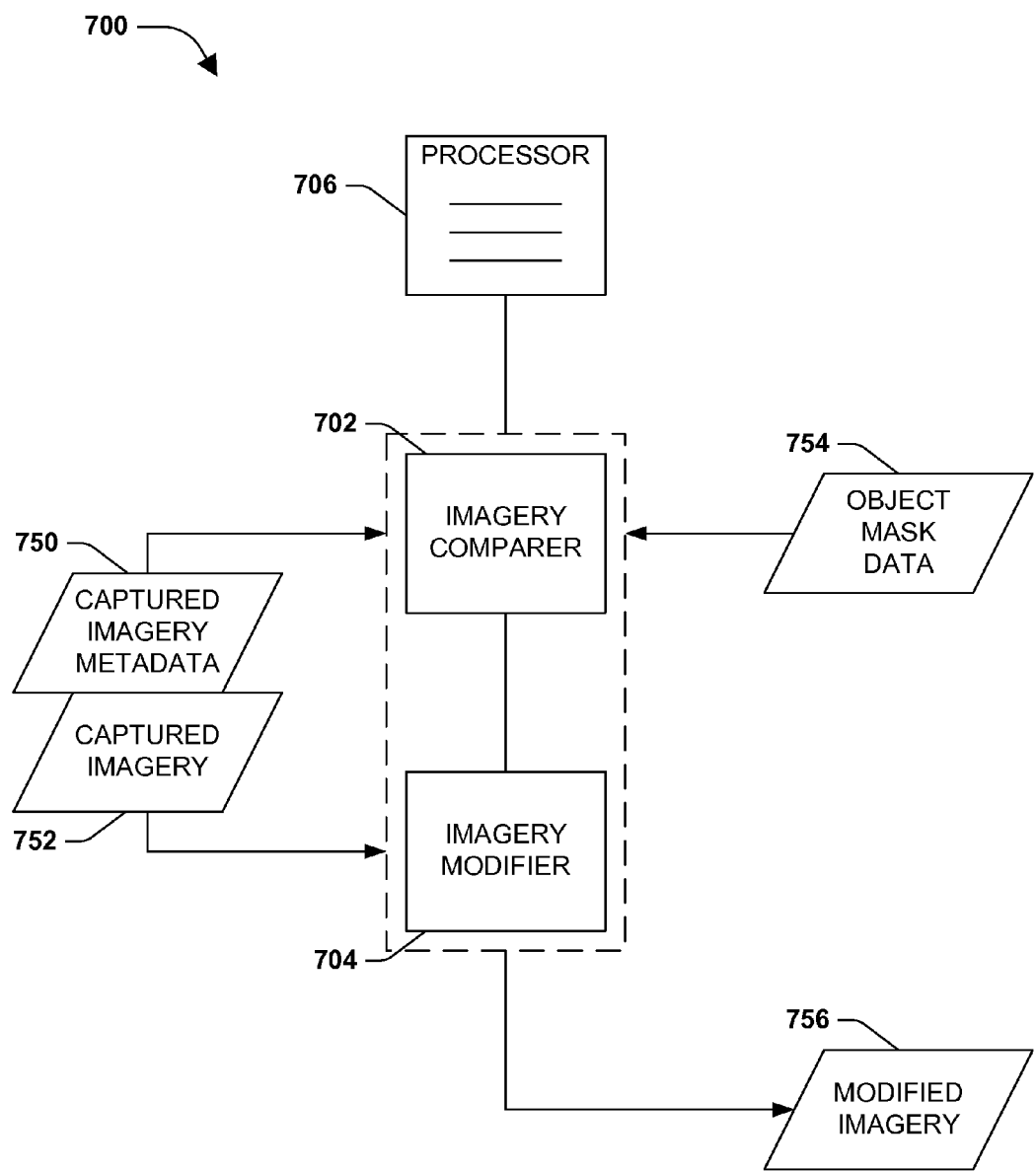
FIG. 7 is a component diagram illustrating an example system for modifying a view of a desired object in imagery.

FIG. 7 is a component diagram illustrating an example system 700 for modifying a view of a desired object in imagery. In the exemplary system 700, an imagery comparison component 702 is configured to compare first capture event imagery metadata 750 with object mask data 754 (e.g., for a first desired object) to determine whether first capture event imagery 752 corresponding to the first capture event imagery metadata 750 comprises an undesired view of the desired object (e.g., a discernible view of an "opted-out" object). Further, an imagery modification component 704 is operably coupled with the imagery comparison component 702. The imagery modification component 704 is configured to modify the first capture event imagery 752, resulting in a desired view of the desired object in the first capture event imagery (e.g., a blurred out view of an "opted-out" building). At least a portion of the example system 700 is implemented, at least in part, via a processing unit 706.

As one example, captured imagery (e.g., digital photos, video, etc.) may be associated with captured imagery metadata indicative of information associated with the capture event (e.g., an event that captured the imagery). For example, the first capture event imagery metadata 750 may comprise a location of the capture event, a time of the capture event, a direction of view of the capture event, object distance from a capture device, type of image capture event device, image capture event device specifications, and/or other information related to the capture event.

Further, for example, the object mask data 754 can comprise metadata indicating, among other things, an area covered by the desired object and/or one or more locations for the desired object. In this example, the imagery comparison component 702 can compare location metadata and/or direction of view metadata from the first capture event imagery 752 with the location metadata for the desired object, to identify whether the first capture event imagery 752 comprises the undesired view of the desired object (e.g., an area of interest). Additionally, the imagery modification component 704 can apply a modification to the imagery comprising the identified undesired view, such that resulting modified imagery 756 comprises a desired view of the desired object (e.g., obscured or highlighted).

Figure 8:
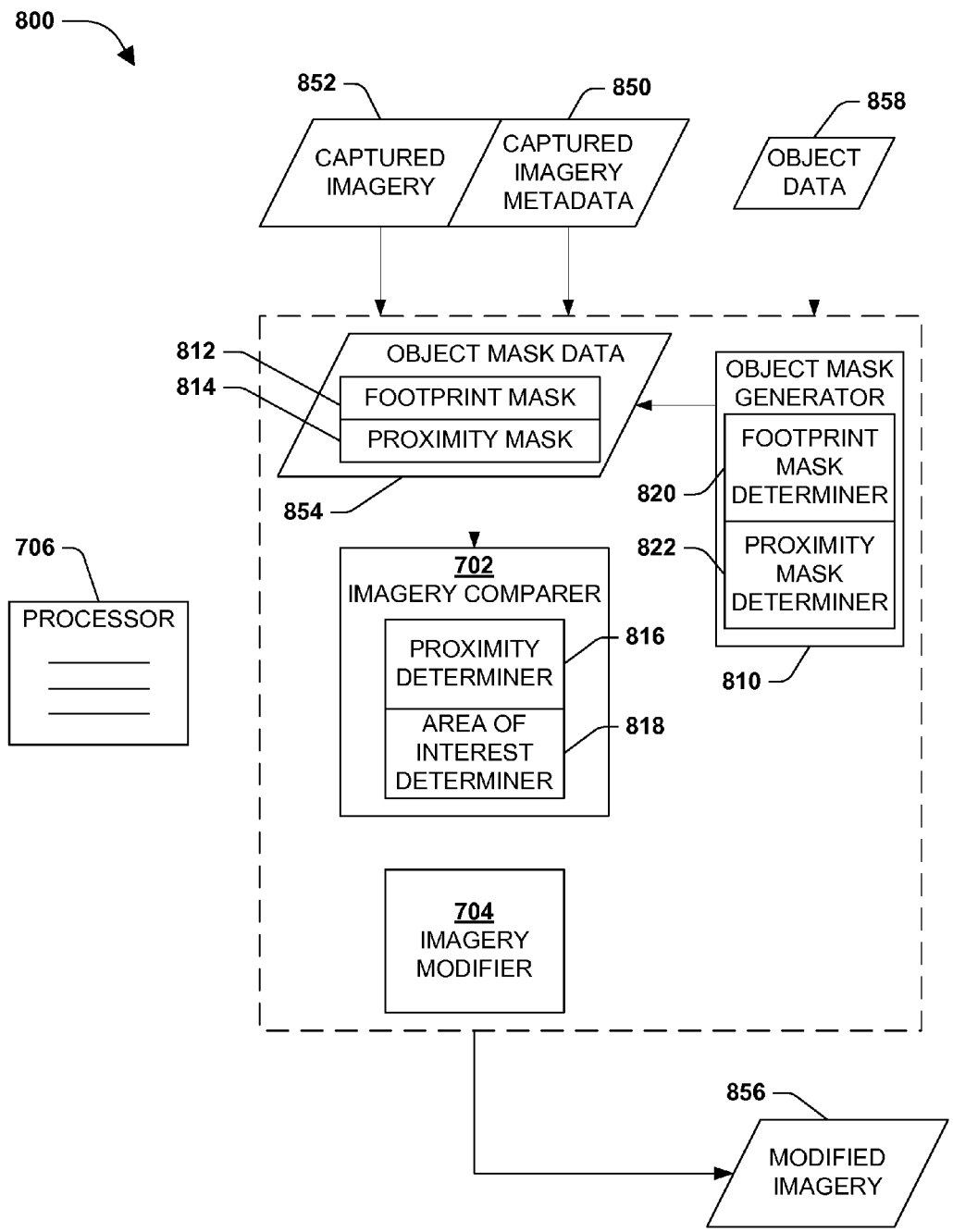
FIG. 8 is a component diagram illustrating an example embodiment where one or more systems described herein may be implemented.

FIG. 8 is a component diagram illustrating an example embodiment 800 where one or more systems described herein may be implemented. In this example 800, an extension of FIG. 7 is provided and thus description of elements, components, nents, etc. described with respect to FIG. 7 may not be repeated for simplicity, for example. In the example embodiment 800, object mask data 854 for a desired object can comprise a footprint mask 812. The footprint mask 812 can comprise a footprint area or dimensional representation of at least the desired object (e.g., area, volume, temporal aspect comprising the desired object, etc.).

The desired object mask data 854 may further comprise a proximity mask 814, comprising a desired area around the desired object. As one example, the proximity mask may represent an area (e.g., volume) surrounding the footprint mask (e.g., the footprint mask being at an approximate center of the proximity mask). In one embodiment, the distance from the desired object to a boundary of the proximity mask may be determined, at least in part, by a resolution distance for an image capture event device used for capture event imagery 852. That is, for example, if the desired object may be distinguishable in imagery from a distance of sixty-five yards, for example, (e.g., based on a camera resolution, focal length, etc.) at least a portion of the boundary of the proximity mask may be sixty-five yards from the desired object.

In the example embodiment 800, an object mask data generation component 810 can comprise a footprint mask determination component 820 that is configured to identify one or more footprint mask geo-locations for the desired object, using object data 858 for the desired object. The object data may comprise, among other things, global positioning coordinates for the desired object, an elevation of the desired object, a description of the desired object, and/or an address of the desired object, for example. In one embodiment, the footprint mask determination component 820 may utilize the object data 858 to identify a boundary of the footprint mask, where the boundary is indicated by corresponding geo-locations, for example.

The object mask data generation component 810 can further comprise a proximity mask determination component 822 that can be configured to identify a desired area around the desired object, using the object data 858 for the desired object and/or capture event imagery metadata 850 for the capture event imagery 852. In one embodiment, the proximity mask determination component may identify the desired area around the desired object and/or modify the area based, at least in part, on capture event imagery metadata that indicates a resolution for an image capture device and/or object visibility data that indicates whether the desired object is visible from a vantage point comprised in the proximity mask.

In the example embodiment 800, the imagery comparison component 702 comprises a proximity determination component 816. The proximity determination component 816 can be configured to compare a first geo-location (e.g., from the capture event imagery metadata 850) for a first image capture event with the proximity mask 814 to determine whether the first image capture event is comprised within the proximity mask 814 for the desired object. As one example, the location of the first capture event is compared with the location of the boundaries of the proximity mask 814 to determine if the first capture event occurred within the proximity mask 814.

The imagery comparison component 702 may further comprise an area of interest determination component 818. The area of interest determination component 818 can be configured to compare a first capture direction (e.g., from the capture event imagery metadata 850) for a first image capture event with the footprint mask 812 to determine whether the first capture event imagery 852 comprises an area of interest, comprising the undesired view of the desired object. That is, for example, the area of interest determination component 818 may identify that the first capture direction of the first capture event intersects at least a portion of the footprint mask 812 (e.g., using location information from the footprint mask 812). In this example, the portion of the footprint mask that overlaps the first capture event imagery may be identified as the area of interest.

In one embodiment, the area of interest determination component 818 may provide the area of interest to the imagery modification component 704. The imagery modification component 704 may modify (e.g., obscure, stitch out, highlight, etc.) the identified area of interest in the captured imagery, resulting in modified imagery 856. The modified imagery 856 may comprise one or more areas of interest (e.g., comprising at least a portion of a desired object), where the respective one or more areas of interest have been modified, for example, where a first area of interest may comprise an obscured portion of a building and/or a second area of interest may comprise a tagged portion of a building, for example. It may be appreciated that by determining an area of interest and/or by modifying (merely) the area of interest, remaining objects in the imagery (e.g., that are not "opted-out") are not removed from the imagery. In this manner, an online mapping application, for example, may present robust imagery of an area (e.g., comprising many landmarks, points of interest, etc.) where merely "opted-out" objects, for example, are removed, less distinguishable, etc. in the imagery. It may be appreciated that where there is sufficient background, surrounding, etc. imagery, a desired (e.g., "opted-out") object may be stitched-out, such as by removing one or more images from the imagery, for example, where the removed images comprise at least some of the desired object but where one or more remaining images of the imagery comprise sufficient background, surrounding, etc. content to supplement, fill-in, etc. the stitched-out object. Moreover, it may be appreciated that the subject matter described herein may be performed automatically, programmatically, etc. such that imagery which may contain a desired object can be identified and/or modified quickly (e.g., in a matter of seconds, in real-time/on-the-fly, etc. as an online map may be generated, for example).

Figure 9:
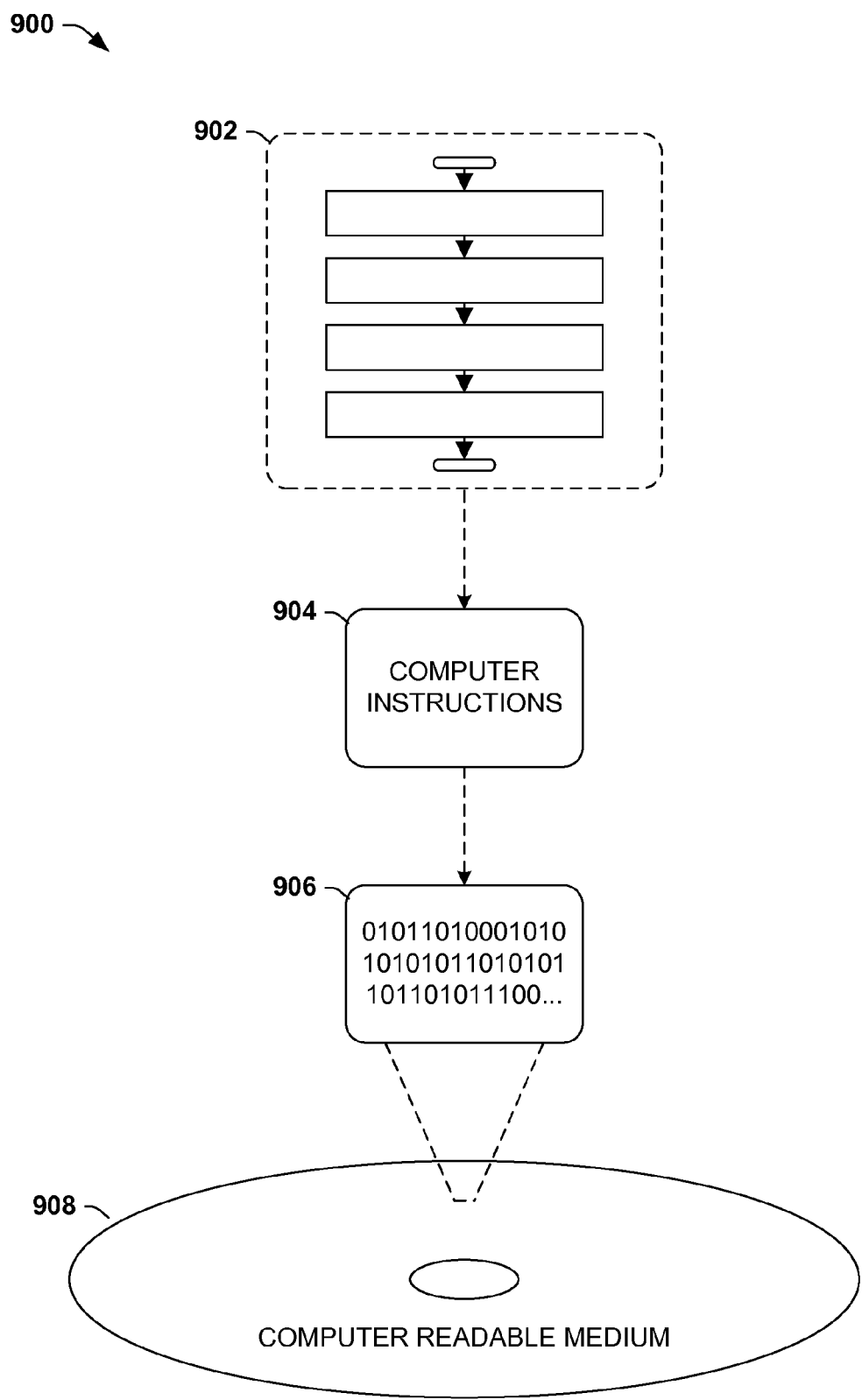
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as at least some of the exemplary method 200 of FIG. 2, for example. In another such embodiment, the processor-executable instructions 904 may be configured to implement a system, such as at least some of the exemplary system 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Figure 10:
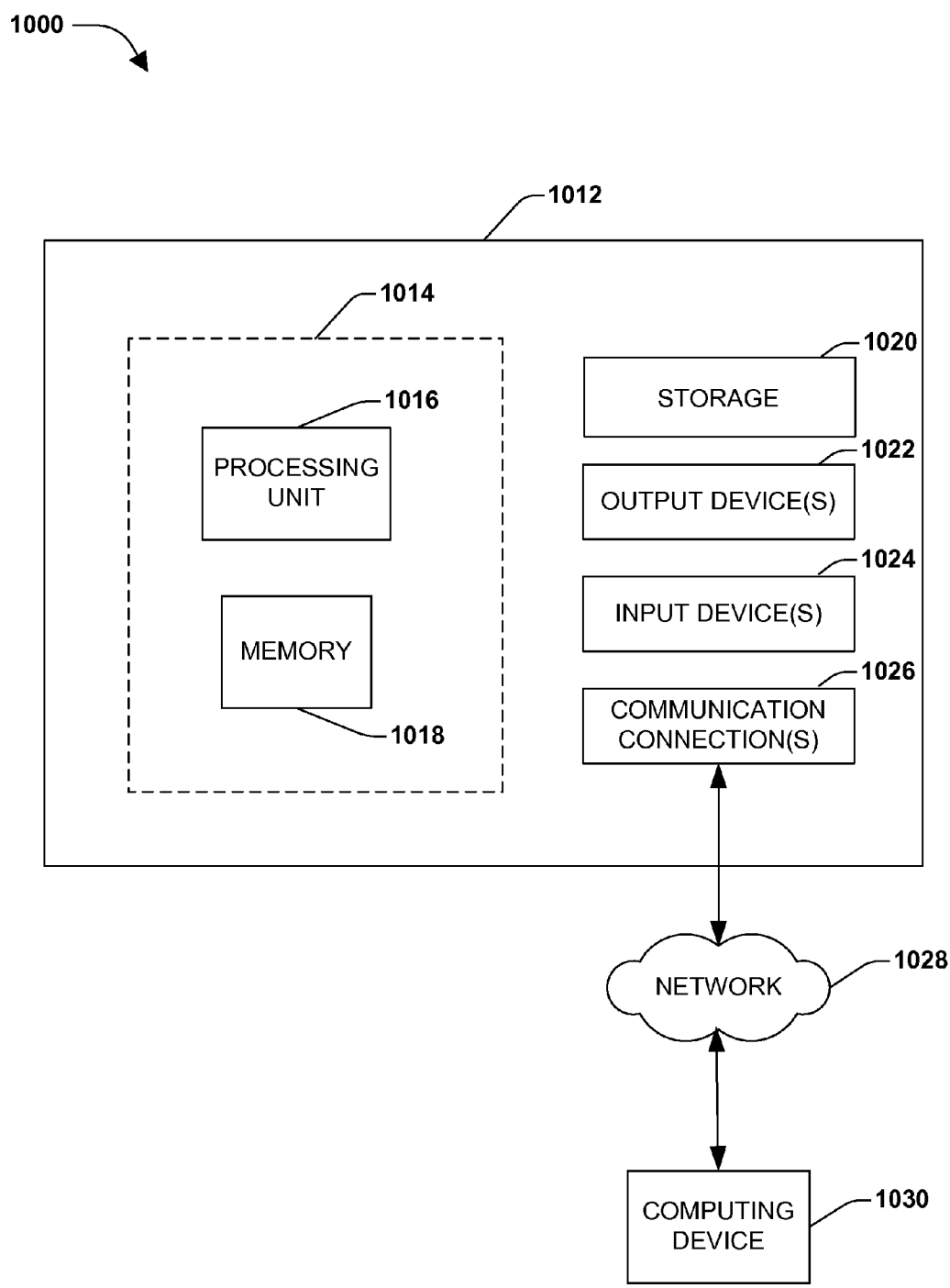
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method, comprising:
    identifying, using a processing unit, a first area of interest in first capture event imagery based upon the first capture event imagery being captured within a proximity mask and at least a portion of the first capture event imagery intersecting at least a portion of a footprint mask, the first area of interest comprising at least a portion of a desired object in at least one image of the first capture event imagery.

2. The method of claim 1, the footprint mask comprising a footprint area of the desired object.

3. The method of claim 1, the first capture event imagery associated with first capture event imagery metadata.

4. The method of claim 3, identifying the first area of interest comprising comparing at least some of the first capture event imagery metadata to at least some footprint mask metadata.

5. The method of claim 3, identifying the first area of interest comprising comparing at least some of the first capture event imagery metadata to the proximity mask.

6. The method of claim 1, comprising automatically creating the footprint mask based upon one or more object identifiers.

7. The method of claim 1, comprising modifying at least a portion of the first capture event imagery based upon the first area of interest.

8. The method of claim 1, the proximity mask associated with the desired object.

9. The method of claim 8, comprising modifying the proximity mask based upon a visibility of the desired object.

10. The method of claim 1, comprising obtaining the proximity mask.

11. The method of claim 1, the desired object comprising a building.

12. The method of claim 1, comprising applying a tag to the desired object in the first capture event imagery.

13. The method of claim 1, comprising adjusting a visibility of the desired object in the first capture event imagery.

14. A system, comprising:
    a processing unit; and
    memory comprising instructions that when executed by the processing unit implement:
        an imagery comparison component configured to compare a first capture direction for a first image capture event with a footprint mask to determine whether first capture event imagery corresponding to the first image capture event comprises an area of interest, comprising an undesired view of a desired object; and
        an imagery modification component configured to modify the first capture event imagery resulting in a desired view of the desired object in the first capture event imagery.

15. The system of claim 14, the imagery comparison component configured to compare first capture event imagery metadata with object mask data for the desired object.

16. The system of claim 15, the object mask data comprising one or more of:
    the footprint mask; or
    a proximity mask.

17. The system of claim 15, the first capture event imagery metadata comprising at least one of a location associated with the first image capture event, a time associated with the first image capture event or a field of view associated with the first image capture event.

18. The system of claim 14, the imagery comparison component configured to determine whether the first image capture event is comprised within a proximity mask.

19. The system of claim 14, comprising an object mask data generation component, comprising one or more of:
    a footprint mask determination component; or
    a proximity mask determination component.

20. A computer readable medium, excluding signals, comprising computer executable instructions that when executed perform a method, comprising:
    receiving object mask data comprising one or more of:
        a footprint mask; or
        a proximity mask;
    determining whether first capture event imagery was captured within the proximity mask;
    determining whether at least a portion of the first capture event imagery intersects at least a portion of the footprint mask; and
    identifying a first area of interest in the first capture event imagery if the first capture event imagery was captured within the proximity mask and at least a portion of the first capture event imagery intersects at least a portion of the footprint mask, the first area of interest comprising at least a portion of a desired object in at least one image of the first capture event imagery.

* * * * *